(12) United States Patent
Nagasawa et al.

(10) Patent No.: US 6,965,950 B1
(45) Date of Patent: Nov. 15, 2005

(54) SIGNAL INPUT AND OUTPUT APPARATUS THAT DISCRIMINATES BETWEEN PLURALITY OF DIFFERENT DEVICES EACH ISSUING UNIQUE CONTROL SIGNALS SUBSTANTIALLY SIMULTANEOUSLY THROUGH SINGLE TRANSMISSION PATH

(75) Inventors: Hirokazu Nagasawa, Kanagawa (JP); Yoshitsugu Nomiyama, Tokyo (JP); Masaaki Kojima, Tokyo (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 09/604,632

(22) Filed: Jun. 27, 2000

(30) Foreign Application Priority Data

Jun. 29, 1999 (JP) .......................................... 11-183817

(51) Int. Cl.⁷ .............................................. G06F 13/00
(52) U.S. Cl. ............................ 710/16; 710/10; 710/14; 710/38; 710/63; 710/308; 710/315; 710/8
(58) Field of Search .............................. 710/10, 14, 16, 710/38, 63, 305, 315, 8, 11, 72, 316; 381/74

(56) References Cited

U.S. PATENT DOCUMENTS

| | | | | |
|---|---|---|---|---|
| 5,264,958 A | * | 11/1993 | Johnson | 710/315 |
| 5,832,244 A | | 11/1998 | Jolley et al. | 710/305 |
| 5,838,989 A | | 11/1998 | Hutchison et al. | |
| 5,842,045 A | * | 11/1998 | Nakamura | 710/63 |
| 6,069,960 A | * | 5/2000 | Mizukami et al. | 381/74 |
| 6,295,519 B1 | * | 9/2001 | Wagner et al. | 703/25 |
| 6,334,160 B1 | * | 12/2001 | Emmert et al. | 710/11 |
| 6,370,603 B1 | * | 4/2002 | Silverman et al. | 710/72 |
| 6,407,554 B1 | * | 6/2002 | Godau et al. | 324/503 |
| 6,460,094 B1 | * | 10/2002 | Hanson et al. | 710/8 |
| 6,594,366 B1 | * | 7/2003 | Adams | 381/74 |

FOREIGN PATENT DOCUMENTS

| | | | |
|---|---|---|---|
| EP | 0 577 435 | | 1/1994 |
| JP | 359094101 A | * | 5/1984 |
| JP | 407262759 A | * | 10/1995 |

* cited by examiner

*Primary Examiner*—Tammara Peyton
(74) *Attorney, Agent, or Firm*—Frommer Lawrence & Haug LLP; William S. Frommer; Thomas F. Presson

(57) ABSTRACT

In order to propose a signal input and output apparatus for changing over control depending on a detection result by discriminating the type of signals when signals of two or more types are passed in the same signal line, a signal input and output apparatus comprises signal discrimination changeover means for discriminating the type of control signal through cable, plug and jack, as a transmission path generating a discrimination signal, supplying it to a controller, and changing over the control of a signal processor to the controller on the basis of the discrimination signal, and thereby input and output of plural control signals can be processed through a single transmission path. As a result, by a single jack only, plural signals can be passed on the same transmission path by optimizing the transmission and reception paths and transmission and reception elements, and therefore the parts mounting area can be saved, and states of various types of signals can be detected.

6 Claims, 3 Drawing Sheets

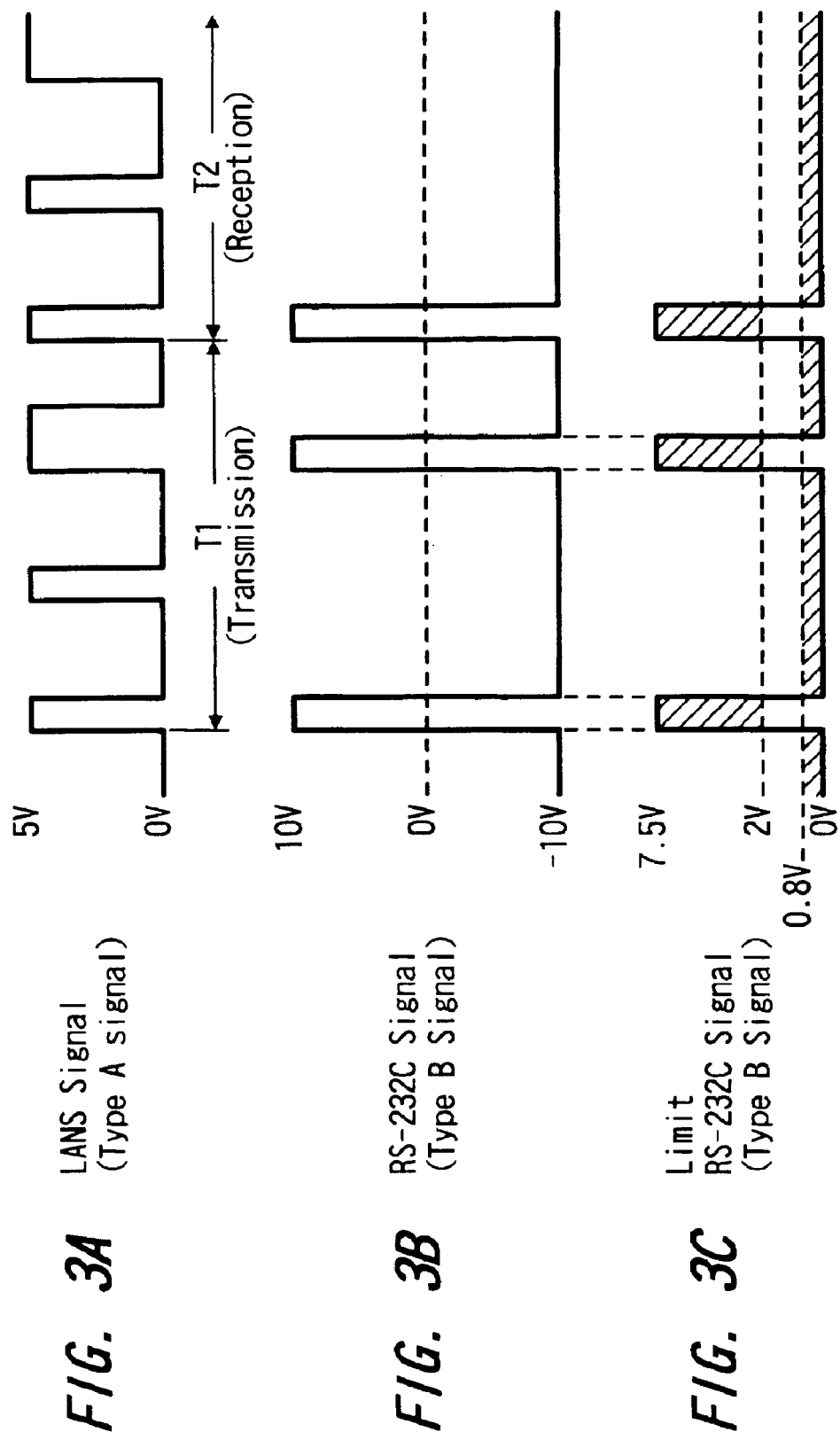

SIGNAL INPUT AND OUTPUT APPARATUS THAT DISCRIMINATES BETWEEN PLURALITY OF DIFFERENT DEVICES EACH ISSUING UNIQUE CONTROL SIGNALS SUBSTANTIALLY SIMULTANEOUSLY THROUGH SINGLE TRANSMISSION PATH

BACKGROUND OF THE INVENTION

1. Field of the Invention

The present invention relates to automatic discrimination of signals transmitted between an electronic appliance and a peripheral device connected thereto, which may be applied, for example, to a video tape recorder integrated with a camera.

2. Description of the Related Art

A conventional video tape recorder integrated with a camera (hereinafter called a camcorder) is composed of a camera unit and a VTR unit, in which the image of a subject taken by the camera unit is converted into an electric signal, and the signal is subjected to a specified process by the VTR unit, and is later magnetically recorded in a magnetic tape.

A peripheral device such as a printer and a personal computer can be connected to this camcorder through a cable. By connecting the printer thereto, the data supplied from the camcorder can be printed, or by connecting the personal computer thereto, the mode and operation of the camcorder can be set or adjusted.

However, since interface formats of transmitted signals are different depending on the peripheral devices connected to the camcorder through cables, there has been a demand that the camcorder be constituted so that cables of plural interfaces can be connected thereto In such a conventional camcorder, even if a jack is constituted such that cables of plural interfaces are capable of being connected, when signals of two or more kinds are passed onto a same signal line, an undesired signal flows into the camcorder side, which may cause malfunction thereof.

If the signal line is divided into a plurality of lines depending on the types of signals, the number of the cable increases, and there is an inconvenience that the jack of the camcorder side becomes larger in size.

Or if a signal of a large signal level passes in a signal system of a small signal level, the input system of the signal system of a small signal level becomes an excessive input, and the input element may be broken.

If a different signal is passed to the same jack, it requires a changeover of the control system by discriminating the different signal.

Another inconvenience is that the operation is complicated in order to change over the control system on the basis of the detection result of the signal.

SUMMARY OF THE INVENTION

The invention is devised in consideration of the above problems, and it is hence an object thereof to propose a signal input and output device for changing over the control depending on the result of detection by discriminating the type of signal when signals of two or more types flow in the same signal line.

To solve the above problems, a signal input and output apparatus of the present invention has the following configuration and operation.

The signal input and output apparatus issues a control signal from a signal processor to the outside by a controller through a transmission path, and controls the signal processor by the controller on the basis of a control signal entered from the outside.

In particular, it comprises signal discrimination changeover means for discriminating the type of the control signal entered through the transmission path, generating a discrimination signal, supplying it to the controller, and changing over the control of the signal processor to the controller on the basis of the discrimination signal, and therefore input and output of plural control signals are processed through a single transmission path.

The signal discrimination changeover means discriminates types of plural control signals, and generates discrimination signals. The controller changes over the control of the processor depending on a discrimination signal. As a result, although, in principle, signals of different signal levels cannot be passed on the same transmission path, by changing over the control of the signal processor, the transmission and reception paths and transmission and reception elements of one signal and other signals can be optimized, so that plural control signals can be passed on the same transmission path.

BRIEF DESCRIPTION OF THE DRAWINGS

FIG. 3 is a diagram showing signals of the embodiment of the invention, in which FIG. 3A is a LANC signal (type A signal), FIG. 3B is an RS-232C signal (type B signal), and FIG. 3C is a limit RS-232C signal (type B signal).

DESCRIPTION OF THE PREFERRED EMBODIMENTS

Figure 1:
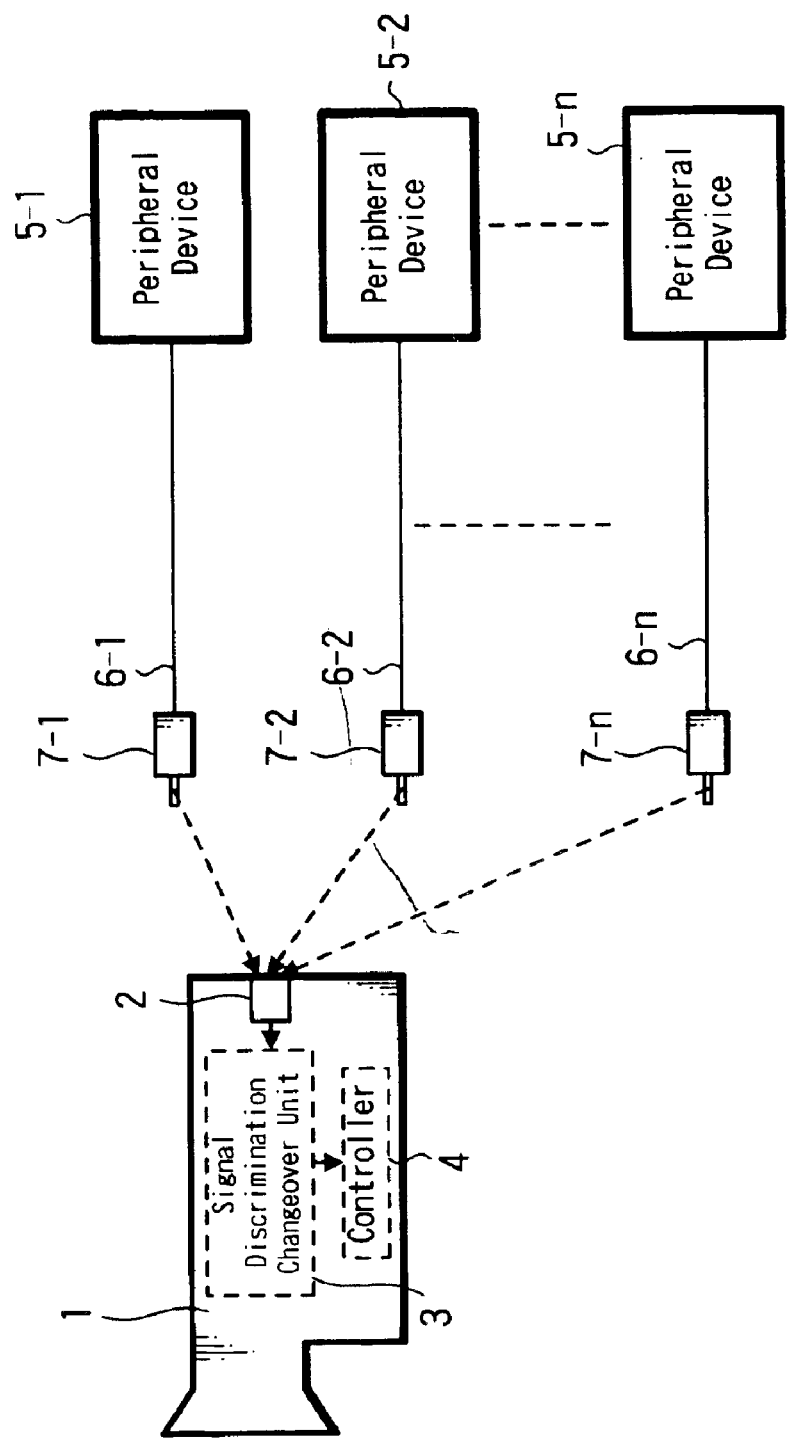
FIG. 1 is a diagram showing a connection state of a camcorder and peripheral device in which a signal input and output apparatus according to an embodiment of the invention is applied.

Referring now to the drawings, an embodiment of the invention is described in detail below. A signal input and output apparatus of the embodiment is applied to an electronic appliance, for example, a camcorder.

FIG. 1 is a diagram showing a connection state of a camcorder and peripheral devices to which the signal input and output apparatus of the embodiment of the invention is applied.

The camcorder 1 to which this invention is applied is composed of a camera unit and a VTR unit, and the image of a subject taken by the camera unit is converted into an electric signal, and the signal is processed as described below in the VTR unit, and is magnetically recorded in a magnetic tape.

In FIG. 1, the camcorder 1 comprises, although not shown, lenses of the camera unit, a charge coupled device (CCD), a camera signal processing circuit for processing video signals from the lenses and CCD by color correction or others so as to be processed in a later stage, and a controller 4 having a microcomputer for controlling the camcorder 1.

The camcorder 1 further comprises, as a VTR unit, although not shown, a recording and reproduced signal processing circuit for performing modulating and demodulating, heads, a tape, and a driver for modulating and demodulating digital video signals from a digital still camera or the like.

The camcorder 1 also includes a jack 2 which can feed an adjusting signal (LANC interface signal) from the outside into the signal processor, and send an adjusting signal (LANC interface signal) from the signal processor to the outside, and also can feed a digital still signal (RS-232C interface signal) from the outside into the signal processor, and send a digital still signal (RS-232C interface signal) from the signal processor to the outside.

The camcorder 1 still more includes a signal discrimination changeover unit 3 which discriminates the type of control signal supplied into the jack, in particular, from a peripheral device connected to the outside through a cable, and changes over the controller 4. A controller 4 changes over the signal processor depending on the discrimination signal from the signal discrimination changeover unit 3. As a result, an optimum changeover is realized depending on the type of the signal.

The camcorder 1 is connected to peripheral devices as described below.

A peripheral device 5-1 is, for example, composed of a personal computer and others, and incorporates an adjusting value setting circuit for setting the modes such as ordinary operation mode and still operation mode for supplying mode signals and adjusting value signals to the camcorder 1, and adjusting the zoom, color and others, and a signal detecting circuit for detecting various output signals from the camcorder 1. The mode setting and adjusting value setting circuits of the peripheral device 5-1 are connected to the jack 2 of the camcorder 1 through a cable 6-1 and a plug 7-1. As a result, type A signal (LANC interface signal) is mutually transmitted and received between the camcorder 1 and the peripheral device 5-1, so that the modes can be set and adjusted.

Herein, the LANC (a registered trademark of Sony Corp., also called Control L) interface is a method of two-way communication control by one line between the camcorder which is the master and the peripheral device which is the slave. By this system, the camera, VTR, and tuner can be connected easily, and the VTR can be manipulated from the camera or the tuner. Or, by connecting an editing machine, two VTRs can be controlled. Moreover, by connecting a personal computer, the user's original application software can be executed.

A peripheral device 5-2 is, for example, a printer, and is connected to the jack 2 of the camcorder 1 through a cable 6-2 and a plug 7-2. As a result, type B signal (RS-232C interface signal) is mutually transmitted and received between the camcorder 1 and the peripheral device 5-2, so that a still picture can be printed.

A peripheral device 5-n is connected to the jack 2 of the camcorder 1 through a cable 6-n and a plug 7-n. As a result, type Z signal is mutually transmitted and received between the camcorder 1 and the peripheral device 5-n, so that various operations are executed.

Figure 2:
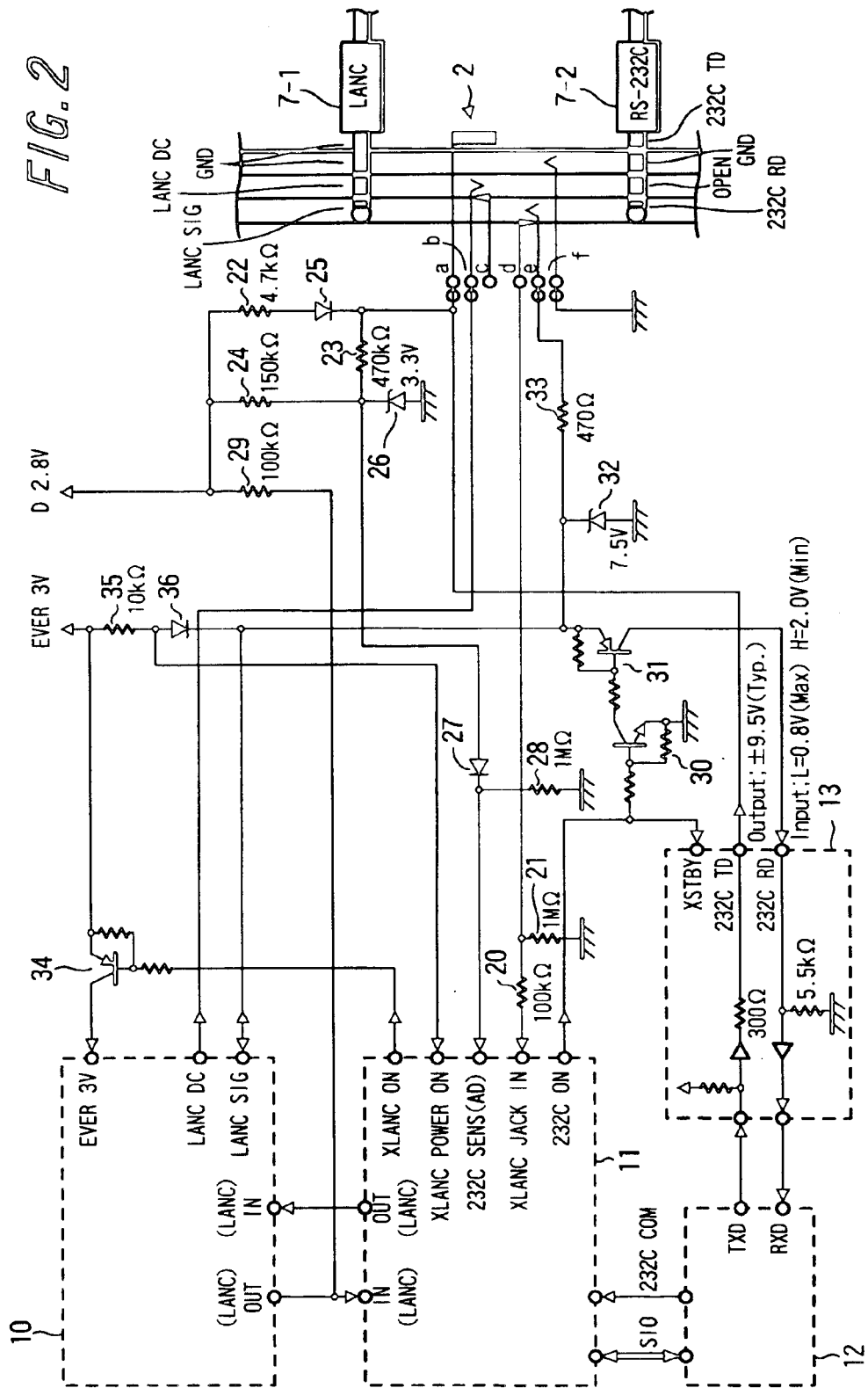
FIG. 2 is a circuit diagram showing a configuration of a signal discrimination changeover unit of the camcorder of the embodiment of the invention.

FIG. 2 is a circuit diagram showing the structure of the signal discrimination changeover unit of the camcorder of the embodiment. In this structure, for example, two different signals, LANC signal (type A signal) and RS-232C signal (type B signal), are transmitted and received between the camcorder 1 and peripheral devices 5-1, 5-2 through one jack 2.

FIG. 3 shows various signals of the embodiment, FIG. 3A showing LANC signal (type A signal), FIG. 3B showing RS-232C signal (type B signal), and FIG. 3C showing limit RS-232C signal (type B signal).

Herein, the LANC signal (type A signal) requires one DC power line, one two-way signal line (0 V to 5 V swing), and one grounding line. The RS-232C signal (type B signal) requires one transmission signal line from the main body (±10 V swing), one reception signal line (±10 V swing), and one grounding line. Usually, for connecting them to the main body, five lines must be connected by using one grounding line commonly, but in the embodiment, it is achieved by connecting four lines as shown in FIG. 2.

In FIG. 2, the signal discrimination changeover unit of the embodiment has the jack 2 (6 wires) which is consituted in the way that the plug 7-1 (3 poles) for feeding the LANC signal or the plug 7-2 (4 poles) for feeding the RS-232C signal can be inserted thereto.

When the plug 7-1 (3 poles) for feeding the LANC signal is inserted into the jack 2, contact (a) and contact (f) of the jack 2 contact with the grounding (GND) junction of the plug 7-1, contact (b) and contact (c) come into contact with the power source LANC DC junction of the plug 7-1, and contact (d) and contact (e) come into contact with the two-way signal LANC SIG junction of the plug 7-1.

Or, when the plug 7-2 (4 poles) for feeding the RS-232C signal is inserted into the jack 2, contact (a) of the jack 2 comes into contact with the transmission signal 232C TD junction of the plug 7-2, contact (f) comes into contact with the grounding GND junction of the plug 7-2, contact (b) and contact (c) come into contact with the open-end OPEN junction of the plug 7-2, and contact (d) and contact (e) come into contact with the reception signal 232C RD junction of the plug 7-2.

The contact (d) of the jack 2 is connected to the ground through a resistor 21, connects with a resistor 20 in series, and is connected to XLANC JACK IN terminal for detecting insertion of jack of HI (human interface) controller 11.

The contact (e) of the jack 2 is connected to a resistor 33 in series with its input level being limited to 7.5 volts by a Zener diode 32, and is connected to 3-volt power source EVER 3V through a diode 36 and a resistor 35.

The contact (b) and contact (c), and contact (d) and contact (e) of the jack 2 are mutually cut off when the plug 7-1 (3 poles) or plug 7-2 (4 poles) is not inserted in the jack 2, and the contacts are connected when either is inserted.

Therefore, when the plug 7-1 (3 poles) or plug 7-2 (4 poles) is not inserted in the jack 2, the contact (d) and contact (e) of the jack 2 are cut off, and the contact (d) is connected to the ground through the resistor 21, and therefore a low level L is detected at the XLANC JACK IN terminal for detecting insertion of jack of the HI controller 11. At this time, the HI controller 11 turns off both XLANC ON terminal and 232C ON terminal. Thus, the HI controller 11 monitors the voltage of the XLANC JACK IN terminal, and low level L is detected, so that absence of plug is detected, the XLANC ON terminal and 233C ON terminal are both turned off, so that the power of the LANC interface circuit 10 and RS232C interface circuit 13 can be saved.

While the plug 7-1 (3 poles) or plug 7-2 (4 poles) is inserted in the jack 2, the contact (d) and contact (e) of the jack 2 contact with each other, and the contact (e) is connected to the 3-volt power source EVER 3V through the diode 36 and resistor 35, and therefore a high level H is detected at the XLANC JACK N terminal for detecting insertion of jack of the HI controller 11. At this time, the HI controller 11 detects presence of plug, and advances to the next detection step as shown below. Thus, the jack insertion can be detected.

In this manner, the HI controller 11 monitors the voltage of the XLANC JACK IN terminal, and high level H is detected, so that presence of plug is detected, the XLANC ON terminal or 233C ON terminal is turned on, so that the powersaving mode of the LANC interface circuit 10 or RS232C interface circuit 13, respectively, can be canceled.

The contact (a) of the jack 2 is connected to one end of a resistor 23 (470 kΩ), and the other end of the resistor 23 (470 kΩ) is connected to one end of a resistor 24 (150 kΩ). Also one end of the resistor 23 (470 kΩ) is connected to one end of a resistor 22 (4.7 kΩ), and the other end of the resistor 22 (4.7 kΩ) is connected to the other end of the resistor 24 (150 kΩ). The junction of the other end of the resistor 22 (4.7 kΩ) and the other end of the resistor 24 (150 kΩ) is connected to the supply voltage D 2.8 V. Between one end of the resistor 22 (4.7 kΩ) and the contact (a) of the jack 2, a diode 25 is connected in the forward direction, and between the junction of other end of the resistor 23 (470 kΩ) and one end of resistor 24 (150 kΩ) and the ground, a Zener diode 26 of withstand voltage of 3.3 V is connected in the reverse direction.

Herein, a parallel circuit of resistor 22 (4.7 kΩ), with resistor 23 (470 kΩ) and resistor 24 (150 kΩ), or a series circuit of resistor 23 (470 kΩ) and resistor 24 (150 kΩ) each composes a voltage divider. When a current flows from the supply voltage D 2.8 V in the direction of contact (a) of the jack 2, the potential difference of the supply voltage D 2.8 V and contact (a) of the jack 2 is divided into the junction of other end of resistor 23 (470 kΩ) and one end of resistor 24 (150 kΩ) according to the resistance value of each resistor of the parallel circuit and series circuit. When a current flows in the direction of supply voltage D 2.8 V from the contact (a) of the jack 2, the potential difference of the contact (a) and supply voltage D 2.8 V is divided into the junction of the other end of resistor 23 (470 kΩ) and one end of resistor 24 (150 kΩ) according to the resistance value of each resistor of the series circuit.

Accordingly, in detecting insertion of a plug in the jack 2, when presence of the plug is detected, the HI controller 11 discriminates the plug inserted in the jack 2, whether the plug for LANC signal or the plug for RS-232C signal, depending on the voltage level detected at the 232C SENS (AD) terminal. At the inner side of the 232C SENS (AD) terminal, an analog/digital converter (A/D converter) is provided, and the detected voltage is converted into a digital value, and is compared with a specified set value (threshold value) by comparing means.

Therefore, when the plug inserted into the jacket 2 is for RS-232C signal, as shown in FIG. 3B, since the RS-232C signal is +10 V to −10 V, a transmission signal 232C TD of +10 V to −10 V is supplied to the contact (a) of the jack 2. When +10 V is supplied to the contact (a) of the jack 2, the HI controller 11 detects a high level H not exceeding 3.3 V at the 232C SENS (AD) terminal, but when −10 V is supplied to the contact (a) of the jack 2, the HI controller 11 detects a low level L at the 232C SENS (AD) terminal. It is for the purpose of protecting the elements in the 232C SENS (AD) terminal of the Hi controller 11 that the input level is limited to 3.3 volts by the Zener diode 26 of withstand voltage of 3.3 V.

On the other hand, when the plug inserted into the jack 2 is for LANC signal, as shown in FIG. 3A, the LANC signal ranges from 0 V to +5 V, but a grounding signal GND of 0 V is always supplied to the contact (a) of the jack 2. When 0 V is supplied to the contact (a) of the jack 2, the HI controller 11 detects a medium level M of near 1 V at the 232C SENS (AD) terminal.

Thus, in discriminating whether the plug inserted in the jack 2 is the plug for LANC signal or the plug for RS-232C signal, the HI controller 11, when detecting high level H at the 232C SENS (AD) terminal, judges an open state, not being connected to a peripheral device (although the plug for RS-232C signal may be connected, it is judged that the RS-232C interface is turned off), and therefore the HI controller 11 turns off the XLANC ON terminal, and turns on the 232C ON terminal.

The HI controller 11 judges that the plug for LANC signal is connected when the medium level M is detected at the 232C SENS (AD) terminal, and the HI controller 11 turns off the XLANC ON terminal, and turns off the 232C ON terminal.

The HI controller 11 judges that the plug for RS-232C signal is connected and that the RS-232C interface is ON when the low level L is detected at the 232C SENS (AD) terminal, and the HI controller 11 turns off the XLANC ON terminal, and turns on the 232C ON terminal.

Thus, when judging that the plug for RS-232C signal is connected and that the RS-232C interface is ON, the HI controller 11 does not accept the LANC signal, or ignores it if LANC signal is supplied.

In this manner, the HI controller 11 detects the voltage level of the 232C SENS (AD) terminal, and determines the active state of the LANC interface circuit 10 or RS232C interface circuit 13.

When the plug for RS-232C signal is connected, the input impedance of the RS-232C interface is specified at 3 kΩ to 7 kΩ in standard, and therefore detection of a voltage drop by voltage divider in this case is equivalent to detection of this input impedance.

The threshold of each voltage level at the 232C SENS (AD) terminal of the HI controller 11 in this case is set, for example, in the EEPROM and judged on the basis of the set value.

By varying the setting of the voltage divider, and raising the resolution of each voltage level to be detected corresponding to the threshold, not limited to two interfaces, for example, two to four interfaces can be discriminated by detecting each different impedance.

By thus detecting the type of signals, using this result of discrimination, the HI controller 11 optimizes the internal control, and controls the output of several interfaces.

This optimization process by detection of insertion of the jack, by detection of the type of a signal and according to the result of discrimination, is executed by the software stored in the HI controller 11.

As a result, when the HI controller 11 detects the medium level M at the 232C SENS (AD) terminal, the XLANC ON terminal is turned on, and a transistor 34 is turned on, and the three-volt power source EVER 3V is supplied to the EVER 3V terminal which is the supply voltage of the LANC interface circuit 10 through the transistor 34. The LANC interface circuit 10 supplies the power source LANC DC to contact (b) and contact (c) of the jack 2 from the LANC DC terminal Thus, in the supply line of power source LANC DC of LANC signal, no transistor or switch is needed, and power element such as a power transistor is not used, so that loss of supply voltage is eliminated.

The LANC interface circuit 10 sends LANC signal LANC SIG shown in FIG. 3A for transmission (T1) from the LANC SIG terminal to the contact (e) of the jack 2, and the LANC interface circuit 10 feeds the LANC SIG for reception (T2) into the LANC SIG terminal from the contact (e) of the jack 2. In this case, since the HI controller 11 is turning off the 232C ON terminal, only the LANC signal LANC SIG of 0 V to 5 V of two-way signals of transmission and reception signals multiplexed by time sharing is supplied in the contact (e) of the jack 2.

When the HI controller 11 detects high level H or low level L at the 232C SENS (A/D) terminal, the 232C ON terminal is turned on, and the transistor 30 and transistor 31 are both turned on, and the reception signal of RS-232C is supplied from the contact (e) of the jack 2 to 232C RD terminal for reception.

In this case, as shown in FIG. 3B, since the RS-232C signal is +10 V to −10 V, the input level is limited to 7.5 volts by the Zener diode 32 of withstand voltage of 7.5 V, and the limit RS-232C signal of 0 V to 7.5 V shown in FIG. 3C is supplied to the 232C RD terminal for reception of RS232C interface circuit 13. This limiting of the input level at 7.5 volts by the Zener diode 32 of withstand voltage of 7.5 V is for protection of the LANC interface circuit 10 (absolute maximum rating 11 V/rating 8 V) of an input level of 0 V to 5 V.

Herein, on the 232C RD terminal side of the RS232C interface circuit 13, regarding the limit RS-232C signal of 0 V to 7.5 V shown in FIG. 3C, it is composed to judge 0 V to 0.8 V as a low level L, and 2.0 and over (up to 7.5 V) as a high level as indicated by shaded area. This criterion is the same as the judgement of the LANC interface circuit 10 for the LANC signal of 0 V to 5 V. The reception signal is supplied into the RXD terminal for reception processing of a digital still (DS) controller 12 at a later stage, and the signal is processed internally.

Thus, in the reception line of the main body of the RS232C signal, amplitude limiting means (Zener diode 32) of reception signal is provided, and if either one of two signals is received, the internal element of the LANC interface circuit 10 or RS232C interface circuit 13 will not be broken.

Further, by sharing the transmission and reception line of a two-way LANC SIG signal of the LANC signal, and the reception line of a reception signal 232C RD signal of the RS232c signal, the lines connected inside the jack 2 can be decreased by one.

The reception element in the RS232C interface circuit 13 for the RS232C signal is designed to discriminate the data at the same signal level as the LANC signal, so that signal processing at a later stage is easier.

When the HI controller 11 turns on the 232C ON terminal, the XSTBY terminal for standby processing of the RS232C interface circuit 13 is turned on.

From the 232C TD terminal of the RS232C interface circuit 13, a transmission signal is supplied to the contact (a) of the jack 2 for transmission. The transmission signal is supplied into the RS232C interface circuit 13 from the TXD terminal of the digital still (DS) controller 12 of a later stage. The DS controller 12 is a controller for data converter for generating of digital still data.

Thus, in the transmission line of the RS232C signal inside the main body, there is no amplitude limiting means, and hence no effect is caused on the signal level required on the peripheral device side connected with the main body through plug and cable.

When using the LANC signal, the three-pole plug 7-1 is composed so that the transmission line of the RS232C signal from the main body may be connected to the ground connecting part GND of the plug 7-1 by the contact (a) of the jack 2, and therefore, when using the LANC signal, a transmission signal of the RS232C signal is not transmitted by mistake from the main body.

The DS controller 12 and HI controller 11 exchange specified data through the serial input and output port (SIO), and data is supplied from the DS controller 12 to the HI controller 11 through a common terminal.

Data is supplied from the HI controller 11 to the LANC interface circuit 10, and from LANC interface circuit 10 to the HI controller 11, through input and output ports.

So as not to exchange data when the XLANC ON terminal of the HI controller 11 is OFF, the input and output ports on the HI controller 11 side are masked.

A voltage of 3 volts is always supplied from the supply voltage EVER 3V to the XLANC POWER ON terminal for feeding supply voltage of the HI controller 11.

When the open contact OPEN of the plug 7-2 for RS232C touches the contact (b) of the jack 2, the contact (c) contacts with the contact (b), which is intended to prevent the supply voltage LANC DC from going outside through the LANC DC terminal of the LANC interface circuit 10.

In such a combination of hardware and software, by discriminating the type of an input signal and changing over the control depending on the result of detection, when the plug 7-1 for LANC signal is inserted into the main body jack 2, the LANC signal (type A signal) can be used between the main body and the connected peripheral device, and when the plug 7-2 for the RS-232C signal is inserted into the main body jack 2, the RS-232C signal (type B signal) can be used between the main body and the connected peripheral device.

The input and output apparatus of the embodiment can send out the LANC signal or RS-232C signal as a control signal from the LANC interface circuit 10 or RS232C interface circuit 13 as signal processors, by the HI controller 11 as a controller through transmission paths of cables 6-1, 6-2, 6-n, plugs 7-1, 7-2, 7-2, and jack 2, and also control the signal processor by the controller on the basis of a control signal supplied from the outside.

In particular, the 232C SENS (AD) terminal of the HI controller 11 is provided as signal discrimination changeover means for discriminating the type of the LANC signal or RS-232C signal as a control signal entered through the transmission paths, generating a discrimination signal, and supplying it into the controller, and changing over the control of the LANC interface circuit 10 and RS232C interface circuit 13 as the signal processors for the controller on the basis of the discrimination signal, and therefore input and output of plural control signals can be processed through the cable, plug and jack as the single transmission path.

As a result, not requiring a large transmission path, input and output of plural control signals can be processed by a single transmission path alone. And in spite of the principle that different signals cannot be passed on the same transmission path, they can be passed on the same transmission path by optimizing the transmission and reception path of one signal or other signals and the transmission and reception elements. And since power element is not provided in the transmission path, the parts mounting area can be saved, and by discriminating the types of control signals, states of various types of signals can be detected.

In the signal input and output apparatus of the embodiment, as described above, plural control signals, such as LANC signals or RS-232C signals, are individually different in input and output levels, and it is the principle that signals of different levels cannot be passed on the same transmission path, they can be passed on the same transmission path without destroying the elements by optimizing the transmission and reception path of one signal and other signals and the transmission and reception elements.

In the signal input and output apparatus of the embodiment, as described above, discrimination of the type of the LANC signal or RS-232C signal as control signals in the HI controller 11 as signal discrimination changeover means is realized on the basis of the control signal at the jack 2 as the coupling for the signal discrimination changeover means of the transmission path for input and output of control signals, so that the types of control signals can be discriminated securely by raising the resolution.

In the signal input and output apparatus of the embodiment, as described above, the HI controller 11 as the signal discrimination changeover means changes over to inactivate the control system of the LANC signal or RS-232C signal as a control signal of another type than the one discriminated on the basis of the discrimination signal, and therefore transmission or reception of other signals by mistake is eliminated during transmission or reception of a certain signal, so that processing can be changed over In the embodiment, the LANC signal and RS-232C signal are mentioned, but without being limited to either of them, there also can be constitution in which any other arbitrary interface signal can be discriminated.

The signal input and output apparatus of the invention is for issuing a control signal from a signal processor to the outside by a controller through a transmission path, and controlling the signal processor by the controller on the basis of a control signal entered from the outside.

In particular, it comprises signal discrimination changeover means for discriminating the type of the control signal entered through the transmission path, generating a discrimination signal, supplying it into the controller, and changing over the control of the signal processor to the controller on the basis of the discrimination signal, and hence input and output of plural control signals are processed through a single transmission path.

As a result, therefore, not requiring a large transmission path, input and output of plural control signals can be processed by a single transmission path alone, and in spite of the principle that different signals cannot be passed on the same transmission path, they can be passed on the same transmission path by optimizing the transmission and reception path of one signal and other signal and the transmission and reception elements, and moreover since power element is not provided in the transmission path, the parts mounting area can be saved, and by discriminating the types of control signals, state of various types of signals can be detected.

In the signal input and output apparatus of the invention, as mentioned above, the plural control signals are individually different in input and output levels, and therefore in spite of the principle that signals of different levels cannot be passed on the same transmission path, they can be passed on the same transmission path without destroying the elements by optimizing the transmission and reception path of one signal and other signals and the transmission and reception elements.

In the signal input and output apparatus of the invention, as mentioned above, discrimination of the type of the control signals in the signal discrimination changeover means is carried out on the basis of the level of the control signal at a coupling to the signal discrimination changeover means of the transmission path for input and output of control signals, and therefore types of control signals can be discriminated securely by raising the resolution.

In the signal input and output apparatus of the invention, as mentioned above, the signal discrimination changeover means changes over the control system of the control signal of other type than the one discriminated according to the discrimination signal so as to be inactive, and therefore transmission or reception of other signals by mistake is eliminated during transmission or reception of a certain signal, so that processing can be changed over.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A signal input and output apparatus for issuing a control signal from a signal processor to the outside by one of a plurality of controllers through a transmission path, and controlling said signal processor by one of said plurality of controllers on the basis of a control signal entered from the outside, comprising:

a single transmission path along which a plurality of different types of apparatuses can be connected, each of said different types of apparatuses issuing a different type of control signal and receiving control signals from a corresponding one of said plurality of controllers; and signal discrimination changeover means for discriminating the type of control signal entered through the single transmission path corresponding to one of said different types of apparatuses, generating a discrimination signal, supplying said discrimination signal into the signal processor controller, and selecting one of said plurality of controllers corresponding to said discriminated control signal to control the operation of the signal processor controller;

wherein input and output of plural control signals of different types are processed through said single transmission path, said single transmission path supporting two-way communication of said plural control signals, each of said plural control signals having different input and output amplitudes; and wherein discrimination of the type of control signals in said signal discrimination changeover means is carried out on the basis of an amplitude of the control signal at a coupling to said signal discrimination changeover means of the transmission path for an input and output of control signals.

2. The signal input and output apparatus of claim 1, wherein said signal discrimination changeover means changes over the control system of the control signal of a type other than the one discriminated according to the discrimination signal so as to be inactive.

3. The signal input and output apparatus of claim 1, wherein:

one of said plural control signals is an RS-232C signal.

4. A signal input and output method, being a signal input and output method for issuing a control signal from a signal processor to the outside by one of a plurality of controllers through a transmission path, and controlling said signal processor by said one of a plurality of controllers on the basis of a control signal entered from the outside, comprising the steps of:

providing a single transmission path along which a plurality of different types of apparatuses can be connected, each of said different types of apparatuses issuing a different type of control signal and receiving control signals from a corresponding one of said plurality of controllers, discriminating the type of control signal entered through the single transmission path corresponding to one of said different types of apparatuses, supplying a discrimination signal in accordance with said discriminated type of control signal into the signal processor controller, selecting one of said plurality of controllers corresponding to said discriminated control signal to control the operation of the signal processor controller;

inputting and outputting of plural control signals of different types and processing these control signals through the single transmission path, said single transmission path supporting two-way communication of said plural control signals, each of said plural control signals having different input and output amplitudes;

wherein discriminating the type of control signals is carried out on the basis of an amplitude of the control signal at the transmission path for an input and output of control signals.

5. The signal input and output method of claim 4, further comprising:

a step of changing over the control system of the control signal of other type than the one discriminated according to the discrimination signal so as to be inactive.

6. The signal input and output method of claim 4, wherein:

one of said plural control signals is an RS-232C signal.

* * * * *